(12) United States Patent
Creamer et al.

(10) Patent No.: US 6,411,697 B1
(45) Date of Patent: Jun. 25, 2002

(54) SYSTEM AND METHOD FOR PROVIDING CUSTOMER PERSONALIZED AND MODIFIABLE SUBSCRIBER SERVICES

(75) Inventors: Thomas E. Creamer, Boca Raton, FL (US); Zygmunt A. Lozinski, Winchester (GB); Baiju D. Mandalia, Boca Raton, FL (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/315,162

(22) Filed: May 20, 1999

(51) Int. Cl.[7] ............................................. H04M 3/42
(52) U.S. Cl. ...................... 379/201.12; 379/900; 709/1
(58) Field of Search ...................... 379/201.12, 201.02, 379/201.03, 201.05, 900; 709/1

(56) References Cited

U.S. PATENT DOCUMENTS

| | | | |
|---|---|---|---|
| 4,611,094 A | | 9/1986 | Asmuth et al. |
| 4,660,144 A | * | 4/1987 | Walsh ............................ 709/1 |
| 5,222,125 A | | 6/1993 | Creswell et al. |
| 5,544,229 A | | 8/1996 | Creswell et al. |
| 5,544,291 A | | 8/1996 | Gilley et al. |
| 5,771,279 A | | 6/1998 | Cheston, III et al. |
| 6,104,796 A | * | 8/2000 | Kasrai ........................ 379/201 |
| 6,243,443 B1 | * | 6/2001 | Low et al. .............. 379/900 X |
| 6,282,281 B1 | * | 8/2001 | Low ............................ 379/900 |
| 6,314,445 B1 | * | 11/2001 | Poole ............................ 709/1 |
| 6,339,782 B1 | * | 1/2002 | Gerard et al. .................. 709/1 |

* cited by examiner

Primary Examiner—Creighton Smith
(74) Attorney, Agent, or Firm—Joseph C. Redmond, Jr.; Morgan & Finnegan, LLP

(57) ABSTRACT

A telephone system provides subscribers with access to a service provider's platform logic and data implemented in any runtime environment. In one embodiment, the service logic is embodied in Java applets and Java beans in a JAVA virtual machine for subscriber personalizing and modifying the service logic. The provider provides the subscriber a tool kit or access to a support server for writing service logic modifications as JAVA beans. The service logic modification is achieved in a process in which the service requirements and objectives are set. The service specifications are designed, implemented, tested, and rolled out. Initial service provisioning and support is provided a subscriber, service modification by the subscriber is made to subscriber data provisioning and subscriber service logic provisions. A modified service logic is locally tested by the subscriber, followed by remote testing of the modification on the service provider's premises. The service provider provisions and then supports the modified service logic.

14 Claims, 13 Drawing Sheets

SYSTEM AND METHOD FOR PROVIDING CUSTOMER PERSONALIZED AND MODIFIABLE SUBSCRIBER SERVICES

BACKGROUND OF THE INVENTION

1. Field of the Invention

This invention relates to telephone systems and methods of operation. More particularly, the invention relates to customer personalized and modifiable services in a telephone system.

2. Description of Prior Art

Today many calling services are available from Service Providers such as telephone companies, wireless carriers, cable companies and Internet telephony service providers which are provided using service logic implemented on Public-Switched Telephone Network (PSTN) switches, Service Nodes (SN), Intelligent Peripherals (IP), and Computer Telephony (CT) and CT integration platforms. These calling services have interfaces to the Service Providers' customer service personnel and, in some cases, voice and web-based interfaces which allow the subscriber to modify service data. Service data can be characterized as personal information, such as name, address, telephone numbers, lists and personalized recording information such as greetings, messages, directions, etc. A subscriber, however, cannot personalized the service logic provided by the Service Provider in rendering calling services to the subscriber. Personalizing the service logic would be characterized as:

(a) Changing the Voice Menu

Example: "Press 1 to leave a message for Dad; Press 2 to leave a message for Mom; Press 3 to leave a message for Tommy; etc."

(b) Checking the Calling Number to Play a Specific Message to the Caller

Example: Calling your parents, whose number is (777) 555–1234, call and the service logic has been modified to check the calling number and play the associated message— "Mom and Dad, we are out of town for the weekend. We plan to return late Sunday evening and will check messages while we are way . . . ".

(c) Add or Mix Logic from Two Services to Better Suit Your Needs

Example: You purchased two services from the Service Provider and you want them to work together vs. independently. The two services are a "voice mail box" and a "single number service". You change the voice menu from being only voice mail to include "Press 5 to try to contact Tom now". Such a menu selection would cause a single number service to start.

Today, only the Service Provider can provide modifications to the subscriber service logic. Based on the large number of subscribers, personalization of services on an individual subscriber basis is expensive, time consuming, and impractical.

The following problems exist in this Service Provider environment:

1. The need for subscriber personalized mass market service.
2. The need for a universally defined service execution environment.
3. Subscriber access to service logic using a standard tool for customization.

The Service Provider is responsible for the service concept, marketing, development, test, trials, implementation (or roll out), support and assurance. Based on these many responsibilities it is extremely difficult to grasp how the control and modification of the service logic can be given to the subscriber.

Prior art falls mainly in the area of service control using Dual-Tone Multiple Frequency (DTMF) sequences. A customer subscribes to a calling service such as "Call Waiting" and can control usage of "Call Waiting" on a call-by-call basis. An example of disablement of "Call Waiting" could be done by first dialing "*70," before the telephone number. The result would be a single call with no "Call Waiting" modification. Other areas of prior art include allowing the subscriber to update subscriber data (Speed Dial lists, etc.) using Interactive Voice Response (IVR)/DTMF interface. Work over the past years has led to the enablement of web-based interfaces to manipulate subscriber data using the Internet and the subscriber's PC.

Other areas of prior art include:

U.S. Pat. No. 4,611,094 issued Sep. 9, 1986, discloses a method allowing a customer to find telephone service within flexible boundaries for calls directed to the customer. Within constraints imposed by the selected embodiment, the method reduces software development traditionally associated with the provision of new services. A plurality of independent call processing capabilites, such as announcement, designated collection and billing, are provided at a switching office. A program defined by a customer is executed in response to each call to the customer. The program makes decisions based on the parameters of the calls such as time, Automatic Number Identification (ANI), information digits requested and received from a caller, etc., and links together the appropriate ones and capabilities in the proper order to dispose of the call based on the call parameters specified in the program. A customer service may be modified by changing the customer program.

U.S. Pat. No. 5,544,229 issued Aug. 6, 1996, discloses a common adjunct switch in association with a communication network provides a number of functionalities, one of which allows associated subscribers to customize the way in which they receive telephone calls and access enhanced services, such as facsimile services. In particular, each subscriber may dynamically specify a number of calling identifiers and a different call treatment for each such identifier as well as a particular billing mode. A call treatment may include, for example, a specification to forward an associated call to (a) a particular telephone number; (b) a default telephone number, or (c) a messaging service.

None of the prior art discloses implementing a Service Provider's call processing logic and data in a platform specific run-time system to allow the Service Provider to provide calling services which are customizable by subscribers for unique calling services, not otherwise available from the Service Provider.

SUMMARY OF THE INVENTION

An object of the invention is a calling service development process for a Service Provider in implementing subscriber personalized and modifiable calling services in a Service Provider platform-specific run-time system.

Another object is a Service Provider's call processing system embedded in a JAVA virtual machine enabling subscribers to modify Service Provider service logic for customizable calling services.

Another object is a Service Provider call processing system embedded in a JAVA virtual machine which allows subscribers to modify service logic paths and test the modification prior to provisioning the customized service in the Service Provider's call processing system.

Another object is a support server in a call processing system embedded in a JAVA virtual machine in which the server supports service logic uploaded from a subscriber's terminal; telephony/voice interfaces from a Public-Switch Telephone Network (PSTN) and Intelligent Peripheral (IP)/ Data Interface (DI) from any Intelligent Peripheral network.

Another object is a Service Management System which supports a call processing system embedded in a JAVA virtual machine to support service logic downloaded from a subscriber to a Service Provider's platform and Service Provider logic downloaded to the subscriber via the JAVA virtual machine.

Another object is a Service Provider's call processing system embedded in the JAVA virtual machine which provides service assurance support for subscriber personalized service logic.

Another object is a Service Provider's call processing system embedded in a JAVA virtual machine enabling service logic modification by a subscriber to service logic transfers from the Service Provider to the subscriber; service data provisioning using a variety of methods, and service logic modification using a service tool kit provided by the Service Provider.

Another object is a Service Provider's calling system embedded in a JAVA virtual machine to generate billing records which support both flat rate and usage-based billings.

Another object is a Service Provider's calling system embedded in a JAVA virtual machine which supports local and remote testing of modified service logic in the virtual machine.

Another object is a Service Provider calling system having functions which support function sharing between the Service Provider's calling system and the subscriber appliance.

These and other objects, features and advantages are achieved in a Service Provider's calling system embedded in a platform specific runtime system or environment. In one embodiment, the service logic is embodied in a JAVA virtual machine as JAVA applets and JAVA beans. A minimization level of subscriber service is developed and set by the Service Provider. Any required minimization/customization is performed and automated through the provider's Customer Service agent and the provider's Service Management System. Higher levels of customization available to subscribers are developed by the Provider using JAVA bean configuration options in the JAVA virtual machine. After platform installation and testing of the JAVA bean options developed by the Provider, the service logic or JAVA beans are made available to the subscriber from a web site download or CD-ROM/diskette or the subscriber working with a server-based service modification kit. Using a terminal, e.g., PC, and the Provider's service kit, the subscriber may proceed to alter the Provider's service logic for personalizing subscriber service configurations. The subscriber locally tests the personalized service using the Provider's service kit. After local testing, the personalized service is uploaded to the Provider's network for remote testing. The remote testing is done by the subscriber using information provided by the Provider from a service web site. After subscriber remote testing of all modified service logic paths, the service web site performs the service logic update to the Provider Service Management System (SMS) which downloads the subscriber personalized service logic to the Service Provider's platform and applicable only to the subscriber's device. The Provider assumes responsibility for the service assurance of the subscriber's personalized service whether installed on the subscriber's platform or on the subscriber's device.

DESCRIPTION OF THE DRAWING

The invention will be further understood from the following detailed description of a preferred embodiment taken in conjunction with the appended drawing, in which.

DESCRIPTION OF PREFERRED EMBODIMENT

Figure 1:
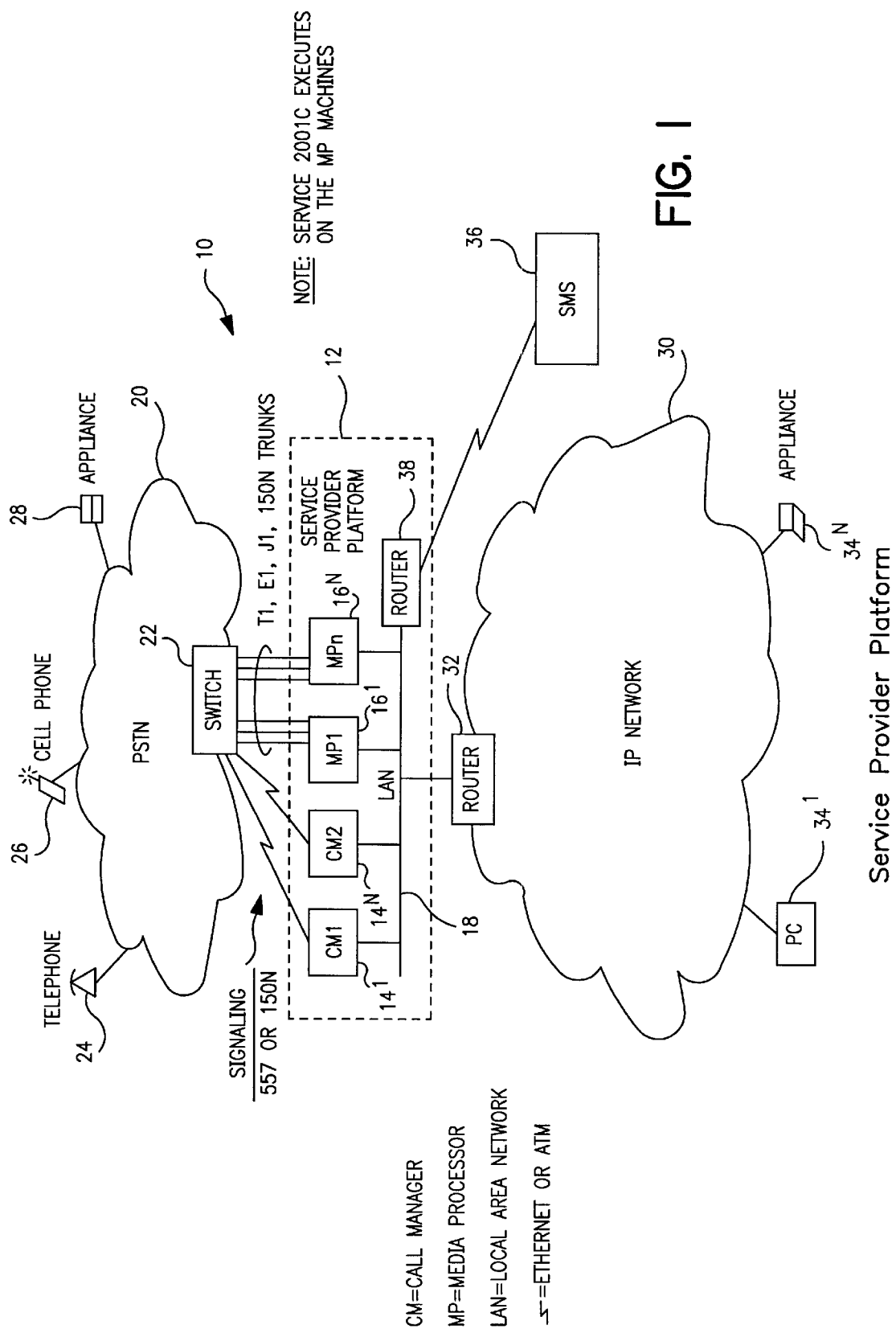
FIG. 1 is a representation of a Service Provider's platform coupled to a Public Switch Telephone Network (PSTN) and Internet Protocol (IP) network for providing calling services to a plurality of subscriber devices, e.g., telephone, cell phones, appliances, PCs, etc., and incorporating the principles of the present invention.

FIG. 1 discloses a telephone system 10 including a Service Provider platform 12 which serves as an addressable entity providing application and administration to a subscriber environment by responding to subscriber requests and maintaining the operational integrity of the system. The provider includes a plurality of call managers $14^1, \ldots, 14^N$ and media processors $16^1, \ldots, 16^N$ linked together through a Local Area Network (LAN) 18 and coupled through conventional trunks, e.g., T1, E1, J1, ISDN to a Public Switch Telephone Network (PSTN) 20 including an electronic switching system 22. The electronic switch 22 uses electronics or computers to control the switching of calls, billing and other functions. Subscriber devices including telephones 24, cell phones 26, and other appliances 28 are coupled to the PSTN 20. The platform is also coupled to an Internet Protocol Network (IPN) 30 through a router 32 coupled to the LAN 18. The IPN 30 is coupled to user or subscriber stations 34', . . . , 34$^N$, typically PC's, workstations, etc. The platform is also coupled to a Service Management System (SMS) 36 through a router 38 coupled to the LAN 18. The Service Management System is part of an intelligent network and allows provisioning and updating of information on subscribers and services in near real time for billing and administrative purposes. The call managers 14 incorporate service logic and data for provisioning telephone service to the subscribers as directed by the system management system 36. The media processors provide storage, network interfaces and memory plus support for all forms of multimedia information traversing the networks 20 and 30. In the present instance, call managers have been implemented in a platform specific run-time system which enables subscribers to modify and personalize service provider logic and data embedded in the run-time system to obtain unique telephone services. To achieve personalization by subscribers, an end-to-end service development process must be redefined. However, before description of the end-to-end service development process, a further description of the platform-specific run-time system will be described in conjunction with FIG. 2.

Figure 2:
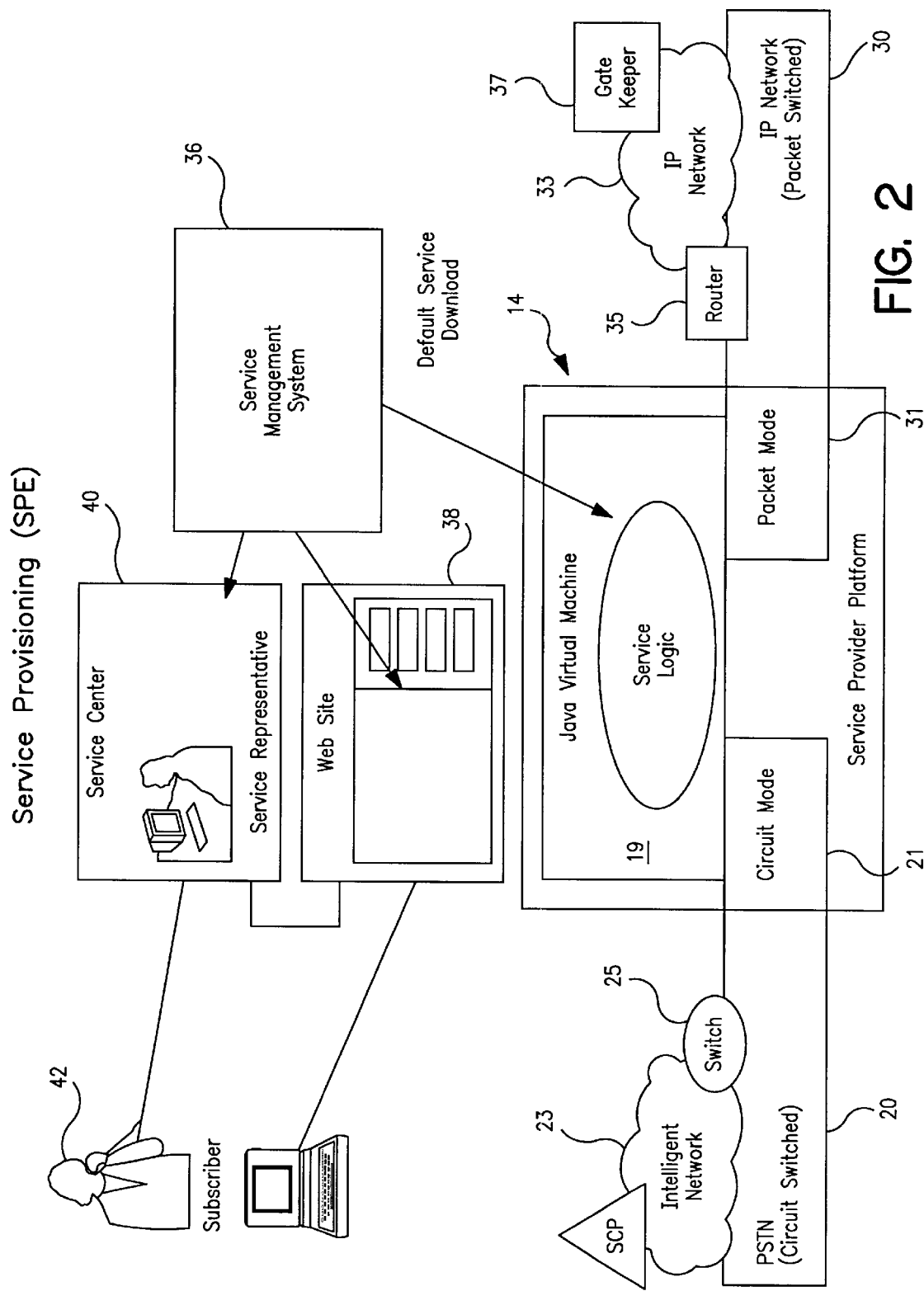
FIG. 2 is a more specific representation of a Service Provider's Premise Equipment (SPE) in FIG. 1 for providing initial subscriber service provisioning and support.

In FIG. 2, the call manager 14 incorporated in the Service Provider platform includes a platform-specific, run-time system, e.g., a JAVA virtual machine 19. While the invention is described in conjunction with JAVA as a runtime system, other runtime systems may be adapted using the principles of the invention to modify and personalize a service provider's logic. In the present embodiment, the machine 19 is coupled to the PSTN 20 through a circuit interface 21 and to the IP or packet-switch network 30 through a packet controller 31 implementing a Transmission Control Protocol/Internet program (TCP/IP). The network 30 is a layered communication system, e.g. an Open Systems Interconnection (OSI). Both the networks 20 and 30 can be linked to other networks. In the case of network 20, an Intelligent Network can be coupled through an Intelligent Network 23 can be linked to the network 20 through a switch 25. The network 23 includes a Service Control Point (SCP) which supplies the translation and routing of data necessary to deliver advanced network services. The IP network 30 may be coupled to other IP networks 33 through a router 35. The network 33 maybe linked to still other IP networks through gatekeeper 37.

In one form, the platform independent-specific run-time system 14 is a JAVA virtual machine 19. JAVA is a programming language developed at Sun Microsystems and designed to be a machine-independent programming language safe enough to traverse networks and powerful enough to replace native executable code. The JAVA programming language is described in "JAVA in a Nut Shell", by J. Zukowski, published by O'Reilly & Associates, Inc., Sebastopol, Calif., 1997. The JAVA run-time system performs all normal activities of a real processor in a virtual environment. The interpreter executes stacked-based instructions; manages a storage heap; creates and manipulates primitive data types; and loads and invokes newly referenced blocks of code. The JAVA interpreter can be implemented in whatever form is desirable for a particular platform. On most systems the interpreter is written in natively compiled language like C or C++. The interpreter can be run as a separate application or embedded in another piece of software such as a web browser. Further details of a JAVA virtual machine are described in the text "Exploring JAVA, 2nd Edition," by P. Niemeyer et al., published by O'Reilly and Associates, Inc., Sebastopol, Calif., 1997.

The JAVA virtual machine 19 executes real time, JAVA applications or "applets". A JAVA applet is a compiled JAVA program, composed of object classes described in object-oriented programming. Applets are autonomous programs confined within the walls of a JAVA virtual machine or a web browser. JAVA applets comprise reusable software components called Java Beans. Java beans define a reusable software building block. A graphical development tool such as the "Abstract Window Tool Kit" (AWT) can determine a building block's capability, customize the building block, and connect the block to other components to build applications. The AWT kit is described in the text, "JAVA AWT Reference", by John Zukowski, published by O'Reilly & Associates, Inc., Sebastopol, Calif., 1997.

The Java virtual machine 19 is linked to the Service Management System. In turn, the Service Management System is linked to a service web site and a Service Provider Service Center 40. A subscriber 42 communicates with the web site 38 and service center 40 regarding the desired calling services features. As previously indicated, the prior art does not provide the subscriber with access to the service logic and data to customize and enable modification of calling services unique to the subscriber.

With the flexibility of Java service creation environment, the Service Provider has many options beyond the traditional SMS and service support representative interfaces to reach the subscriber.

Figure 3:
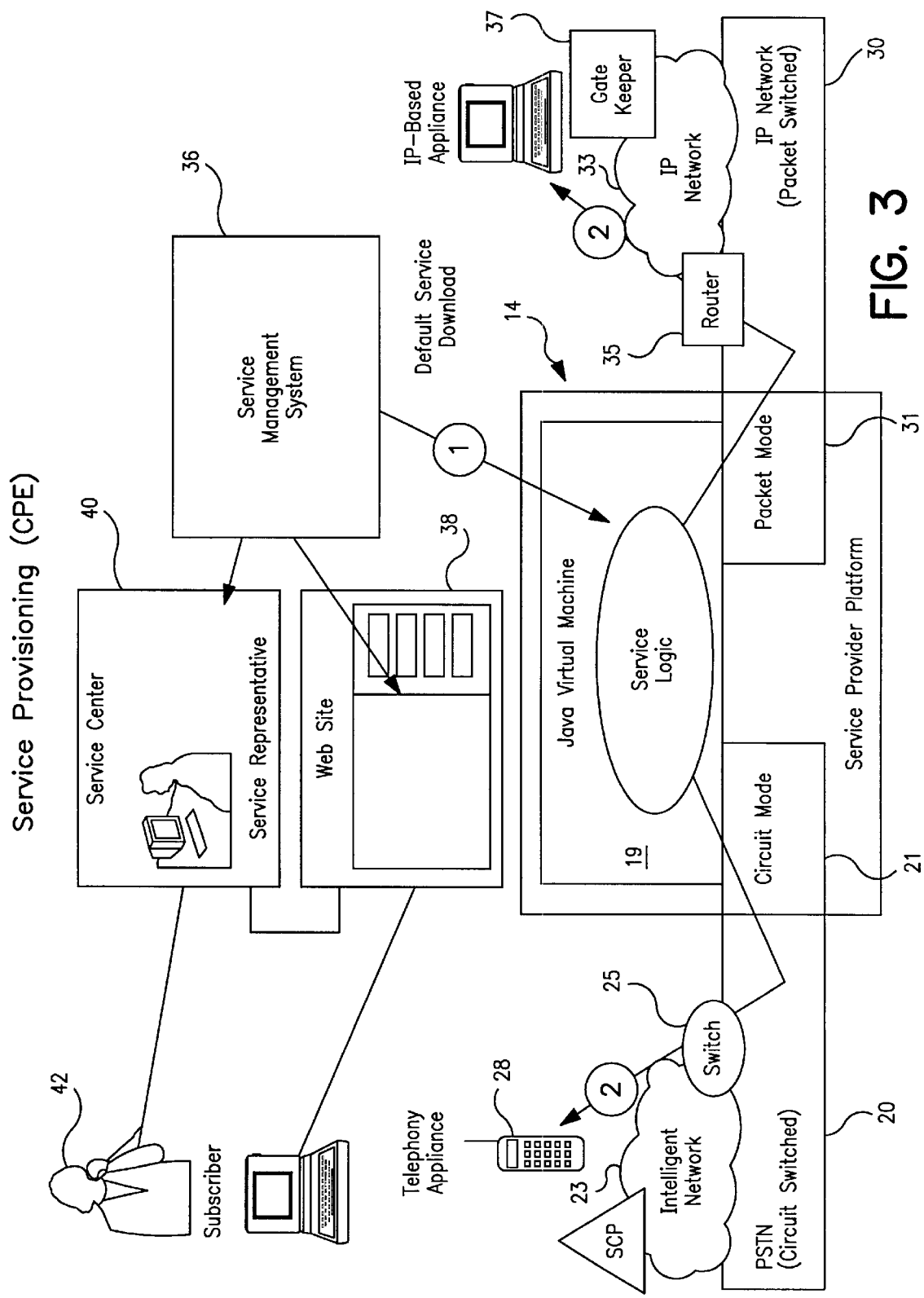
FIG. 3 is a representation of the Service Provider's platform in Customer's Premise Equipment (CPE) in FIG. 1 for distributing or provisioning on to a subscriber's appliance of choice, the service logic provision on a Service Provider's platform in FIG. 1.

In FIG. 3, the subscriber can choose the level of flexibility (customization) that suits his needs. The Service Provider has the ability to have service logic provisioned to a Service Provider platform, i.e., JAVA virtual machine, as Java applets constructed from Java beans, and then distributed for provisioning to the subscriber's appliance of choice, which could be telephony or IP-based.

Figure 4:
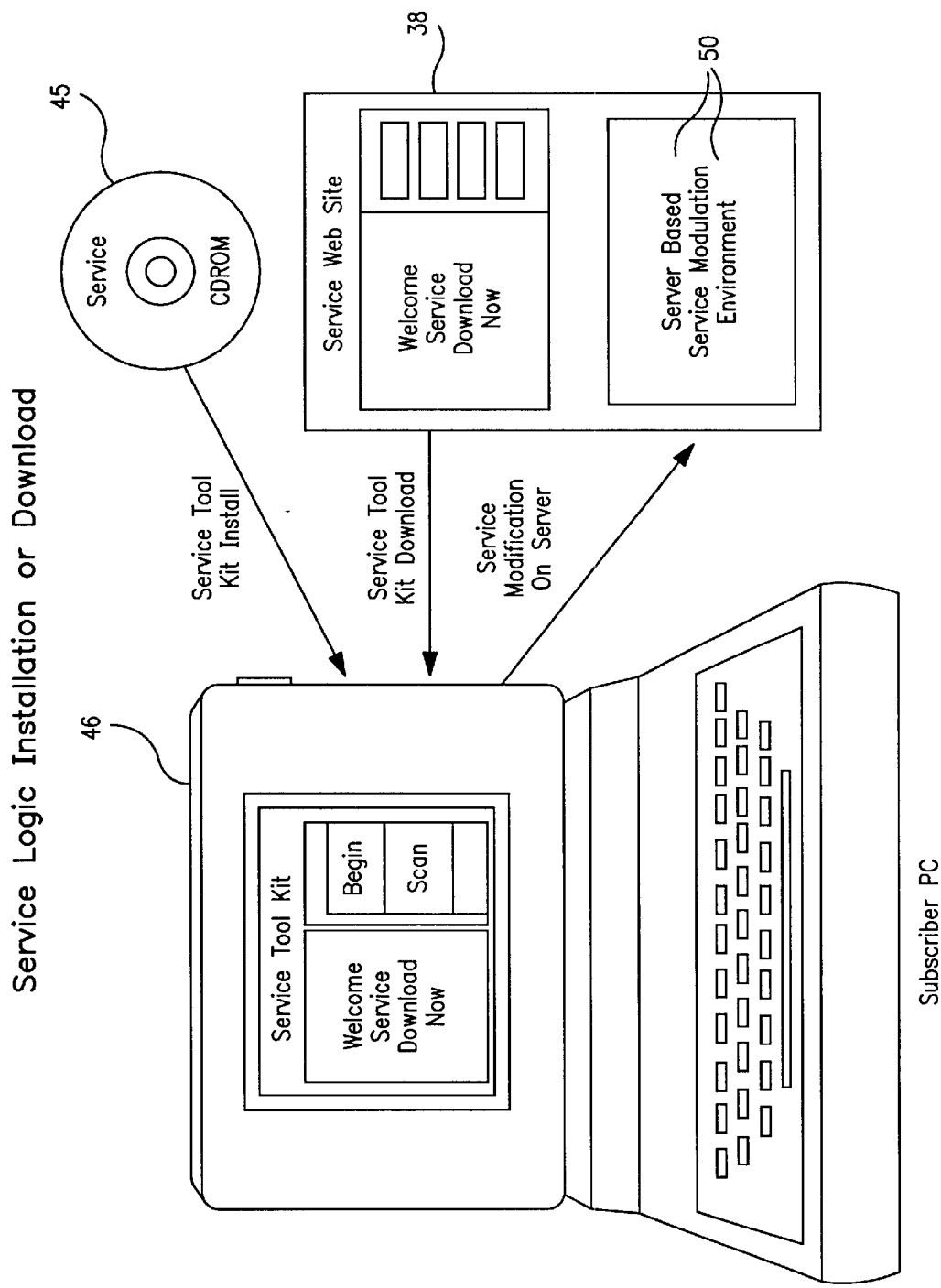
FIG. 4 is a representation of a subscriber service logic installation receiving service tool kits and service modifications from a service web site and a support server.

In FIG. 4, the Service Provider makes available to the subscriber, the service logic or Java beans. The logic can be made available from a web site download or CD-ROM/diskette 45, or by working with a service-based modification environment including a subscriber PC 46 coupled to a Service Took Kit server 38 or a special support server 50. A Service Tool Kit required by the subscriber to customize and/or test the service logic, is provided to the subscriber along with the service logic.

Figure 5:
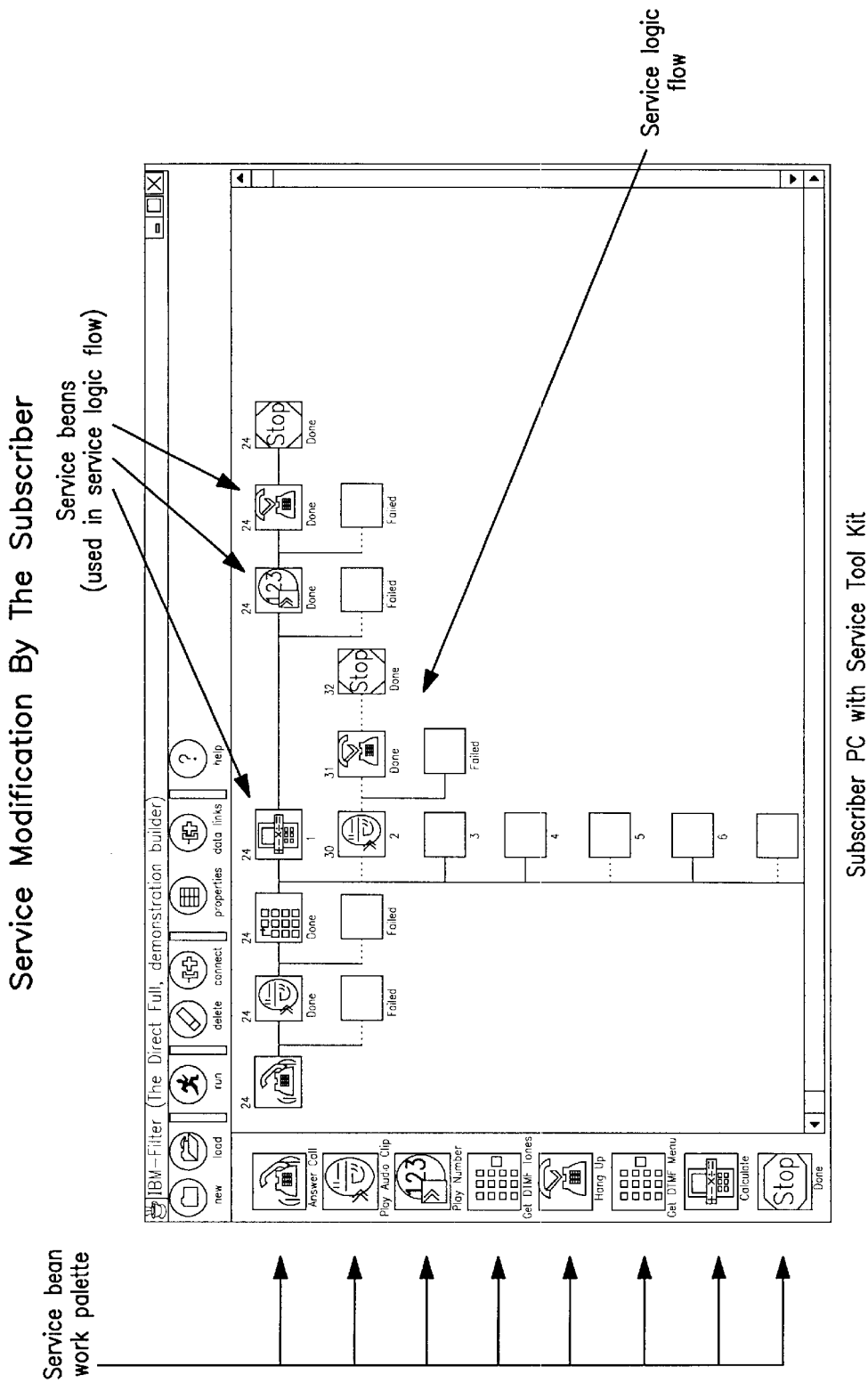
FIG. 5 is a representation of a service modification by a subscriber to the Service Provider's JAVA virtual machine in FIG. 1.

FIG. 5 describes a service modification by the subscriber to the subscriber logic data expressed as Java beans. The service logic flow is depicted as logic data expressed as Java bean icons representing nodes in a logic tree. As modifications or configuration options are made to individual Java beans, the logic tree changes to show blank nodes. These blank nodes represent new logic paths that require action from the subscriber. When all nodes in the logic tree have been addressed, the service is ready for testing by the subscriber.

As part of the Service Tool Kit, a service bean work palette is provided by the service provider. The service bean work palette contains the Java bean icons which support the service. The subscriber drags the Java bean icons from the service bean work palette to the blank nodes in the service logic tree.

At the top of the Service Tool Kit are action buttons which allow the subscriber to manipulate, execute and test the service logic provided by the service provider. Capabilities are provided to:

create "new" service logic

"load" service logic (provided by the service provider)

"run" service logic (for execution and test)

"delete" Java bean icons or logic tree nodes in the service logic tree

"connect" Java bean icons or logic tree nodes in the service logic area look at the "properties" of a Java bean (for configuration changes by the subscriber)

join two or more logic tree nodes together using "data links"

provide "help" for understanding the Service Tool Kit or the service logic.

Subscriber data provision can be provided in a variety of ways:

(a) A service support representative (SMS update).
(b) Voice interface (via phone call to the service logic).
(c) Web interface (subscriber data management).
(d) Subscriber update to the service logic.

Subscriber service logic provisioning under "(d)" is the process of controlling subscriber modified service logic within the Service Provider's network. As described in the subscriber provisioning and support section (FIG. 2), the initial level of service logic provisioning in the network is the "minimal customization level". Once a subscriber has made customization changes to the service logic, the subscriber customized (modified) service logic is uploaded to the Service Provider's service logic provisioning server 50 or web site 38 (see FIG. 4). The subscriber customized service logic is not provisioned on to the Service Provider's network until the subscriber customized service logic has been "tested" by the subscriber.

Testing is performed either locally by the subscriber on subscriber premises or remote testing by the subscriber on the Service Provider's premises.

Figure 6:
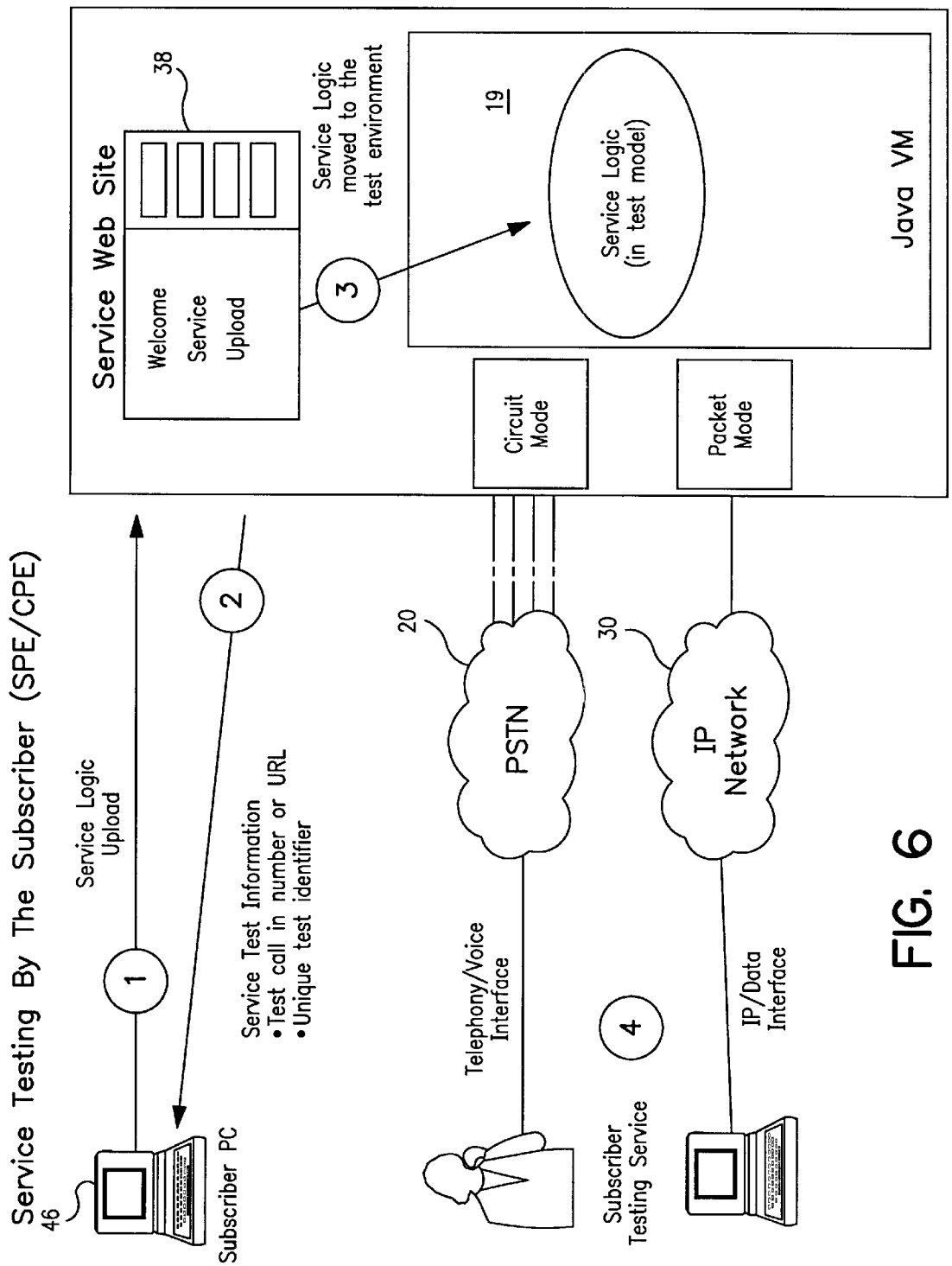
FIG. 6 is a representation of service testing by a subscriber after service logic has been customized locally, tested and uploaded by the subscriber to a service web site and the JAVA virtual machine in FIG. 1.

As shown in FIG. 6, the subscriber PC 46 can upload to the service web site 38 the modified service logic. The web site can provide the PC test information with a test call number or unique test identifier. The service web site can also migrate the service logic to the test environment and the Java virtual machine 19 to provide the service test information.

Alternatively, the provider Java virtual machine may provide the subscriber with a telephony or voice response through the network 20 or to a subscriber testing service through the IP network 30.

In another case, the provider's service logic would understand which configuration options in the service logic had been modified by the subscriber. Once the subscriber has tested each modified configuration object, the service logic would change the object from a "needs tested" to a "tested" state. When the subscriber completes testing the service logic and is satisfied with the results, the subscriber indicates that the service logic is ready for provisioning into the Service Provider's network.

Figure 7:
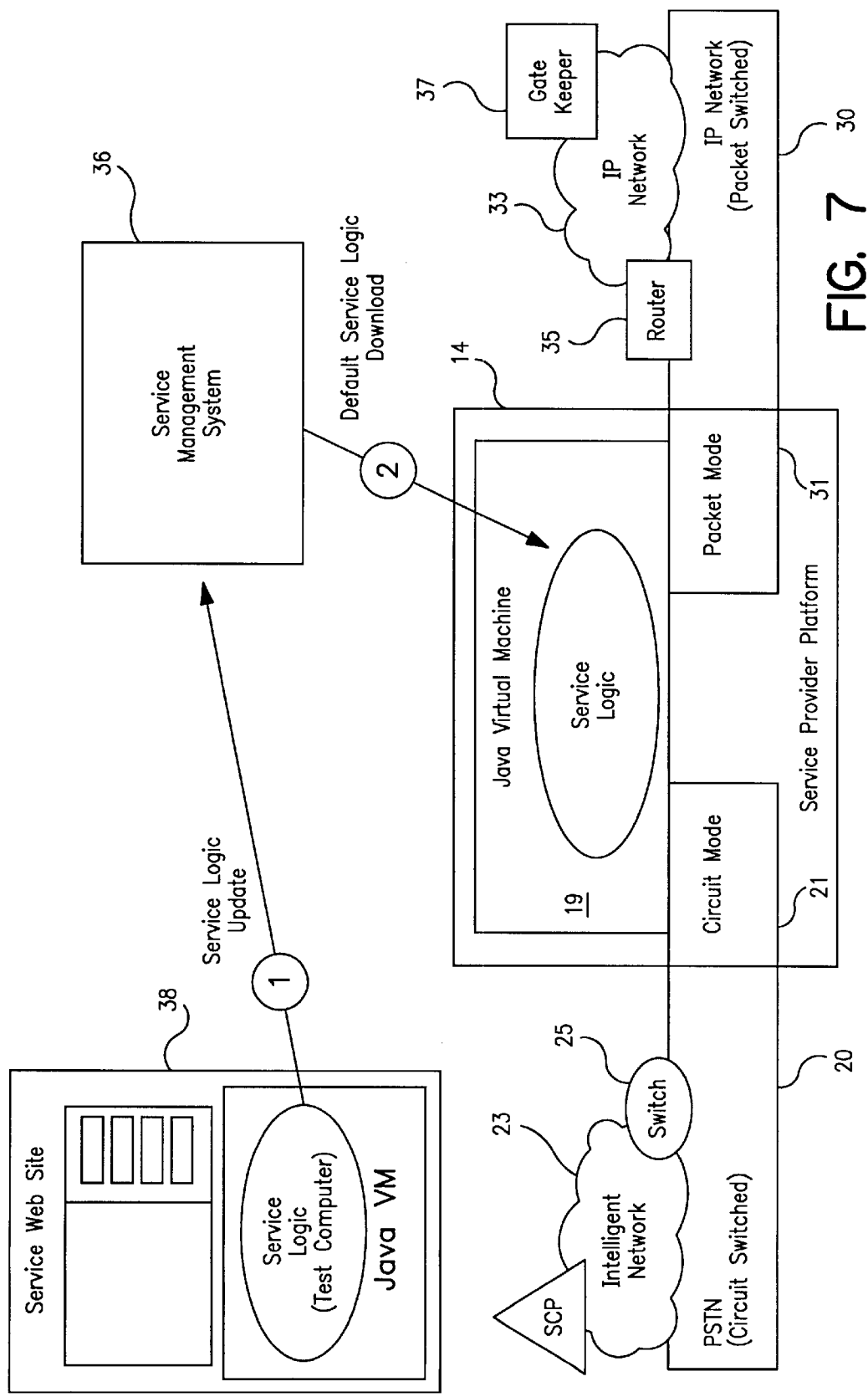
FIG. 7 is a representation of modified subscriber service logic provisioning for a device or appliance selected by the subscriber as the service execution environment.

In FIG. 7, once the subscriber is tested, i.e. all modified service logic paths and the paths have been set to the "tested" state, the service web site 38 prompts the subscriber to see if the service logic testing is complete and ready for provisioning. Given that the subscriber is satisfied with the testing of the modified surface logic, the service web site 38 performs the service logic update to the SMS 36. The SMS will then perform the service logic download to the Java virtual machine 19. Once a modified service logic has been downloaded to the Service Provider platform, depending on the type (or level) of service support that the subscriber has selected, the service logic executes from either the Service Provider's platform or is further downloaded into the subscriber appliance. The downloading allows for the Service Provider platform to provide service continuity in the event the device is powered off or not active. In the instance where the subscriber selected an appliance in the service execution environment, the Service Provider platform will perform the download when the appliance is active and communicate with the Service Provider network.

Figure 8:
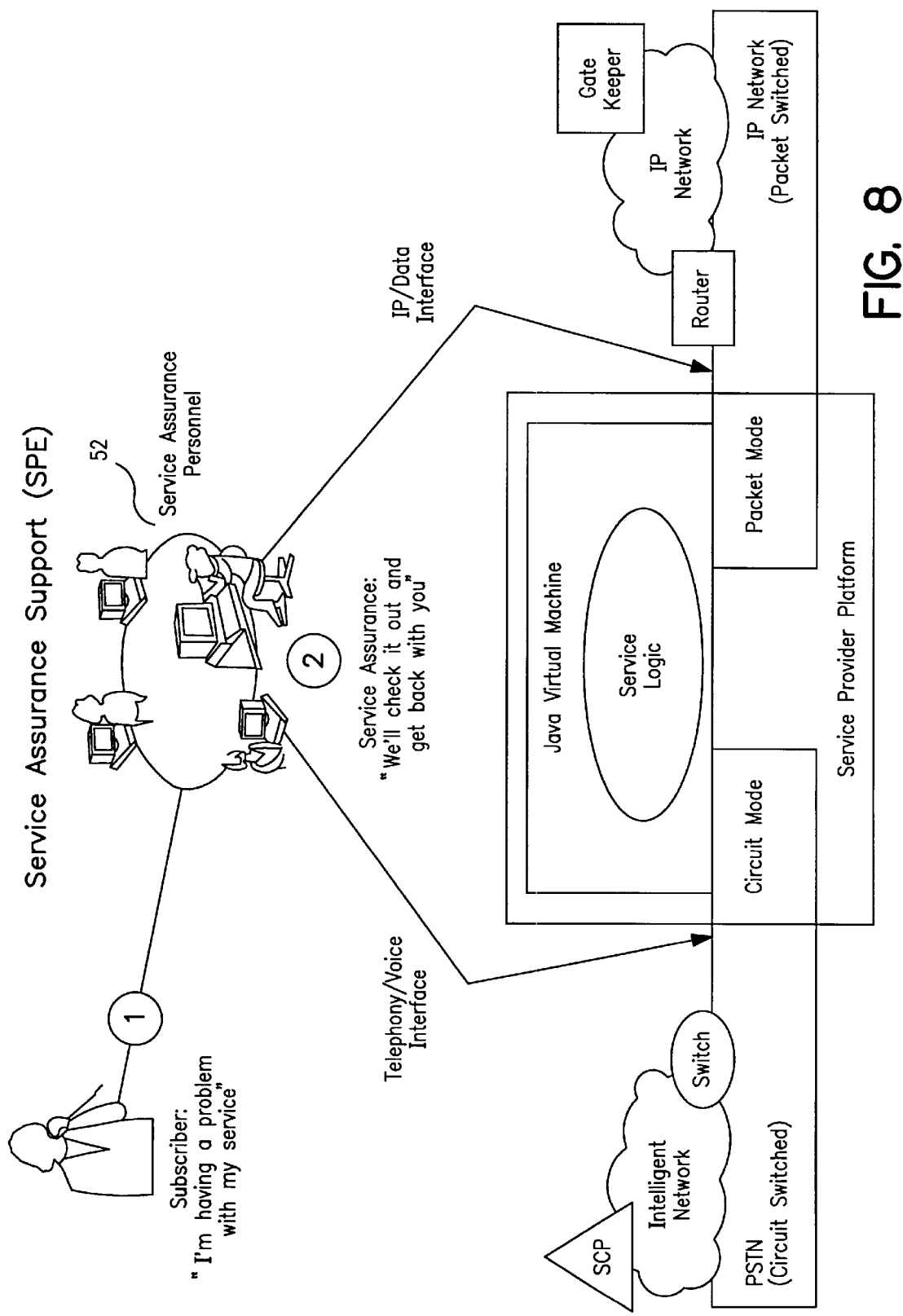
FIG. 8 is a representation of service assurance support provided by the Service Provider for service logic executed on a subscriber's appliance or device.
Figure 9:
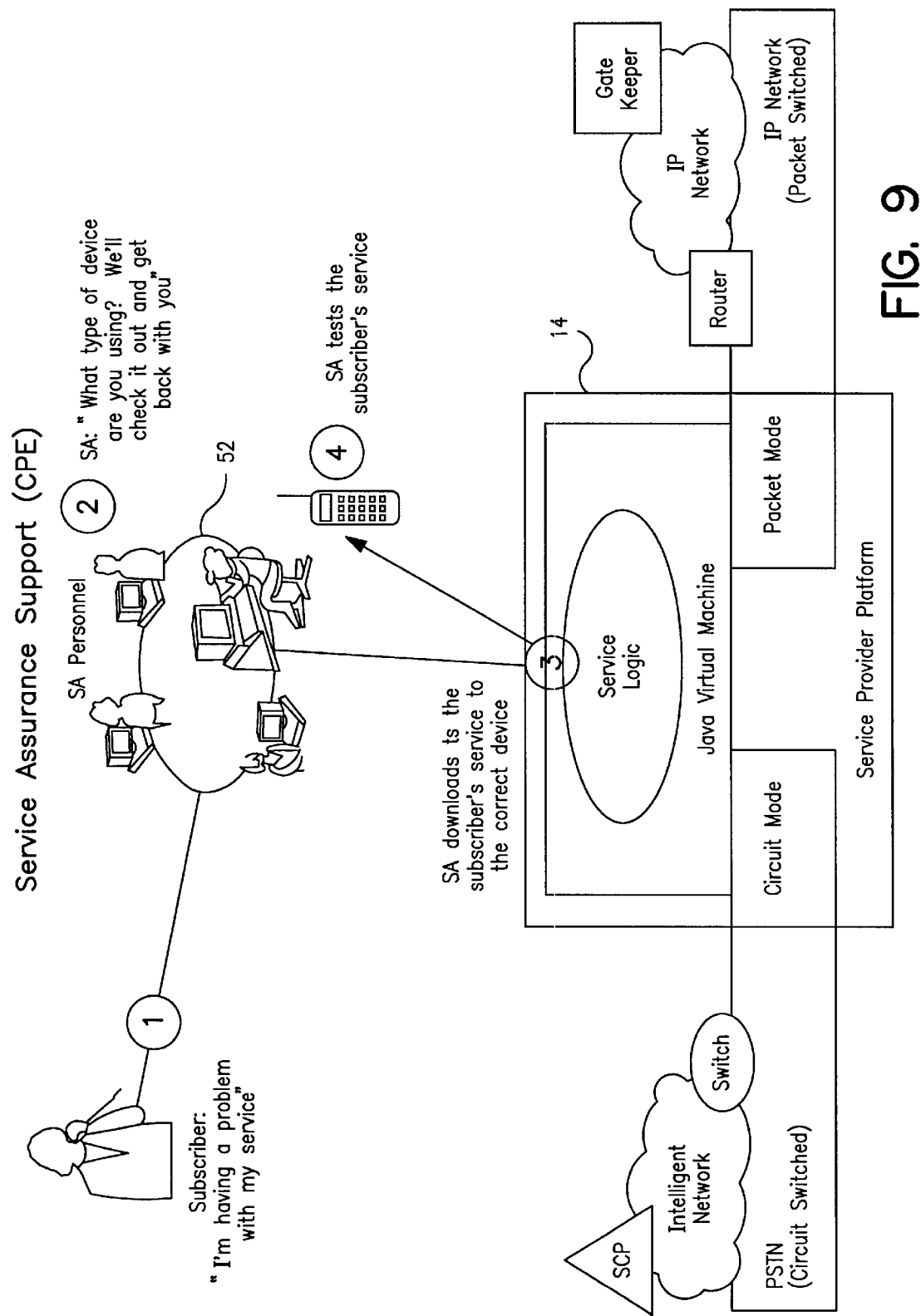
FIG. 9 is a representation of service assurance downloading connected service logic to a subscriber's appliance or device.
Figure 10A:
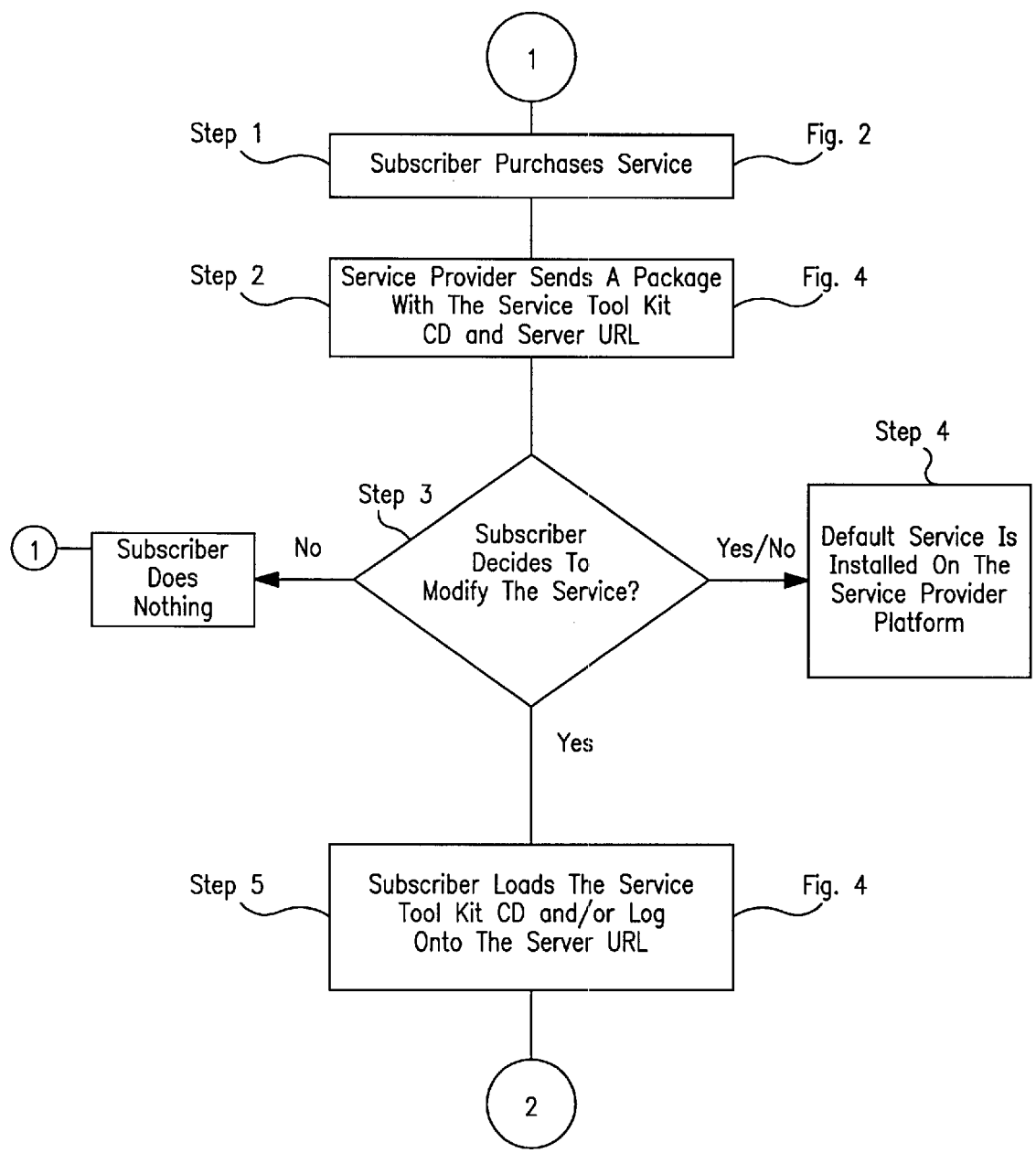
FIGS. 10(a)–10(d) are flow diagrams for implementing, testing (locally or remotely), and providing assurance of subscriber personalized and modifiable calling services in a Provider system implemented in the platform specific runtime system shown in FIG. 1.
Figure 10B:
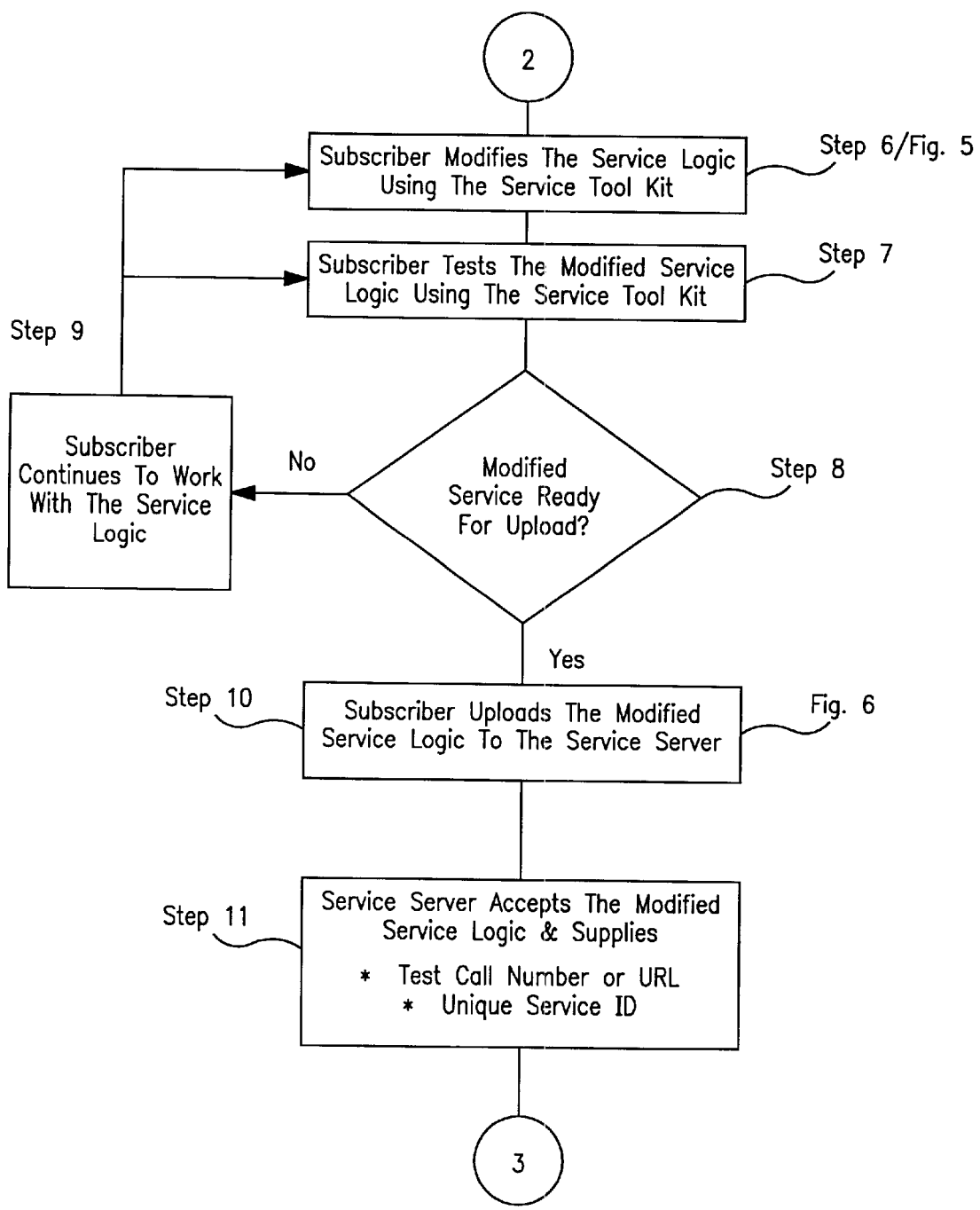
Figure 10C:
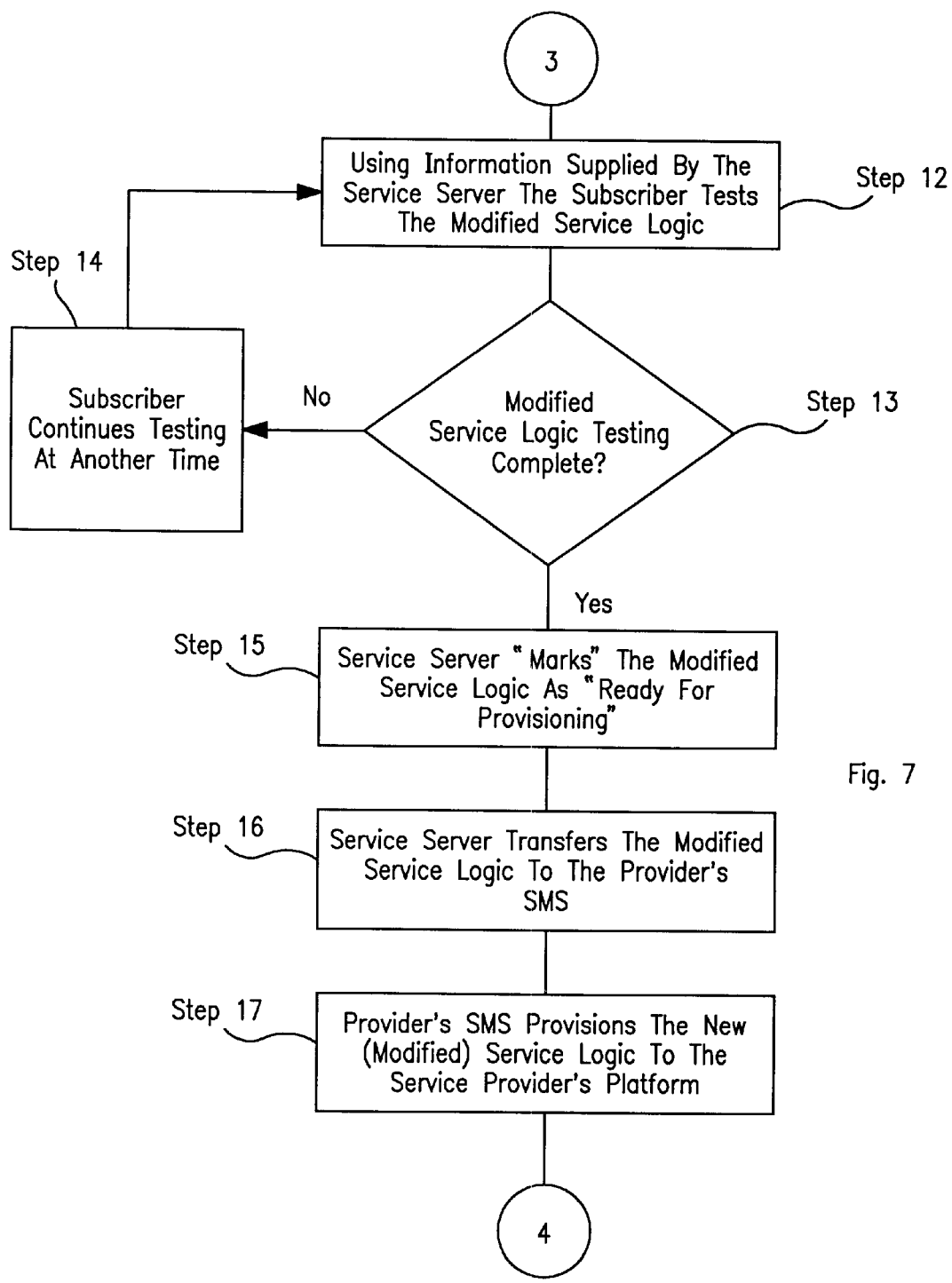
Figure 10D:
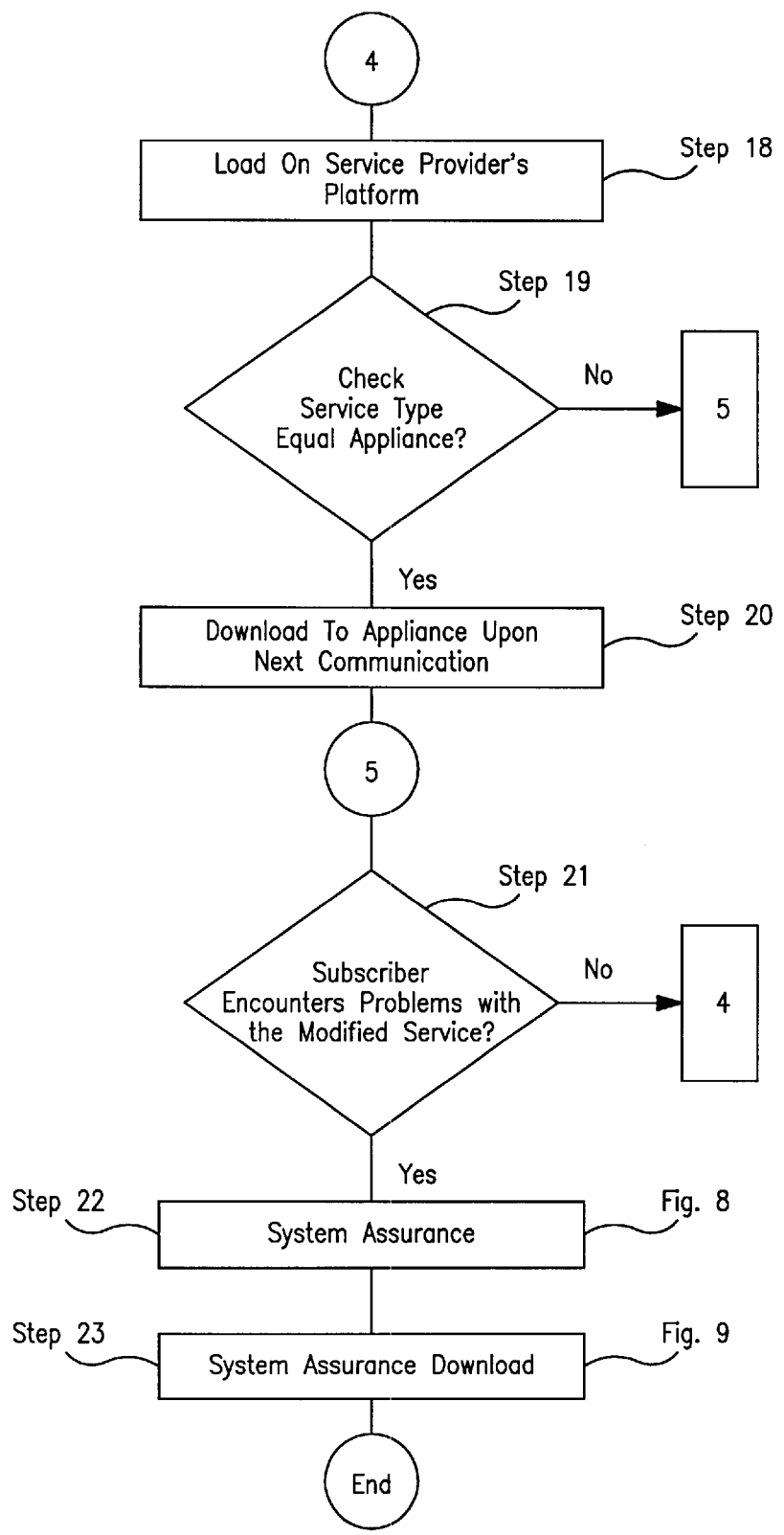

In FIG. 8 the Service Provider is responsible for the service assurance of the subscriber's service logic. As such, a service assurance group 52 participates in the service development process across all of the phases. The critical interaction point for service assurance is during the service usability and subscriber testing phases. By participating during these phases, a Service Assurance group will gain the skills necessary to work with the subscribers to debug service problems as they arise. Where the subscriber's service executes on the Service Provider's platform, the service assurance personnel would debug service logic problems by working with the subscriber's service logic using the Service Provider's platform. The service assurance personnel interface to the Service Provider platform would be either circuit mode (telephony/voice) and/or packet mode (IP/data). Where the subscriber's service executes on an appliance (or device), the Service Assurance personnel would debug service logic problems by working with the same appliance/device type as the subscriber. The service logic would be downloaded to the appliance from the Service Provider Platform and debugged by the Service Assurance personnel.

Now turning to FIGS. 10(a)–10(d), the service development process for subscriber modification and personalization of calling service provided by Service Provider logic and data as implemented in a Java virtual machine will now be described in conjunction with FIGS. 2–9.

In step 1, a subscribe purchases calling services from a Service Provider as further described in FIG. 2.

In step 2, the Service Provider sends a service logic package with a Service Tool Kit and a server URL as further described in FIG. 4.

In step 3, a test is performed to determine whether the subscriber will modify the service logic for his device or appliance. A "no" condition results in a subscriber failing to take any action after which the program returns to entry point 1. A "yes/no" condition results in a step 4, in which the default service is installed in the Service Provider platform. A "yes" condition initiates step 5 in which the subscriber loads the Service Took Kit and/or logs on to the support server URL as shown in FIG. 4.

In step 6, the subscriber modifies the service logic using the Service Tool Kit as shown in FIG. 5, and in step 7, tests the modified service logic using the Service Tool Kit as shown in FIG. 6. In step 8, a test is performed to determine if the modified service logic is ready for upload. A "no" condition initiates step 9 in which the subscriber continues to work with the service logic. A "yes" condition initiates step 10 in which the subscriber uploads the modified service logic to the service server as shown in FIG. 6. In step 11, the service server accepts the modified service logic and applies a test call number or a web URL or a unique service test identifier. In step 12 using information supplied by the service server, the subscriber tests the modified service logic. In step 13, a test is performed to determine if the modified service logic testing is complete. A "no" condition initiates step 14 in which the subscriber continues testing at another time. A "yes" condition initiates step 15 in which the service server marks a modified service logic as "ready" for provisioning as further described in FIG. 7. The service server transfers the modified service logic to the provider's SMS in step 16. The provider's SMS provisions the new modified service logic to the Service Provider platform in step 17 and in step 18 he modified service logic is loaded on to the Service Provider's platform, i.e., Java virtual machine. In step 19, a test is made to determine whether the service type is to be applied to the subscriber appliance. A "no" condition transfers the program to entry point "5" for system assurance considerations. A "yes" condition initiates step 20 which downloads to the appliance the modified service logic upon the next communication after which the process transfer to entry point 2 for system assurance operation.

After the completion of steps 19 and 20, if the subscriber encounters problems with the modified service logic, then in step 21, a test is made to determine whether Service Assurance support is needed. A "no" condition transfers the program to entry point "5". A "yes" condition initiates step 22.

In step 22, system assurance is provided by a system assurance group where the subscriber service executes on an appliance, system personnel debug service logic problems by working with the subscriber as shown in FIG. 8. In step 23, the service assurance personnel would download to the subscriber service to correct the device, after which the service assurance personnel would test the subscriber device and report the results of the problem or solution to the subscriber.

The performance of system assurance for both the provider platform and subscriber appliance or device completes the processing of subscriber personalization and modification of Service Provider logic and data providing calling services implemented in a platform-independent run-time specific system, i.e., Java virtual machine. The implementation of the Service Provider's logic in a Java virtual machine enables a subscriber to generate Java beans for Java applets to generate billing records which support both flat rate and image-based billing.

Summarizing, a system and method have been described for telephone systems to personalize and modify a Service Provider's logic and data, implemented in a Java virtual machine. A process enables service logic modification by the subscriber through a service logic transfer from the Service Provider and service data provisioning using a variety of methods including, but not limited to communicating (a) with a service support representative; (b) phone/voice interface; (c) web interface. The process enables the service logic to function within the Service Provider's platform, or within the subscriber's appliance, or in a function sharing mode between the Service Provider's platform and the subscriber's appliance. The system and method further provide a process enabling the subscriber to test personalized service logic prior to provisioning of the modified service logic by the service provider by local customer premise testing using a service tool kit provided by the service provider or using facilities provided by a service support service for remote testing. A service support server is described with supports service logic upload from a subscriber's terminal for example, e.g., EPC or telephony voice interface from the PSTN or an IP/data interface from any IP network. A service management system supports the provisioning of the subscriber's personalized service logic through support for service logic downloaded to the service provider's platform and support for service logic downloaded to the subscriber's device by the service provider's platform. The system and method further enable the service providers to provide system assurance support of the personalized service logic installed on the service provider's platform or downloaded to the subscriber's device. Using a method such as this enables the service logic to function within the Service Provider's platform, or within the Subscriber's appliance, or in a function sharing mode between both the Service Provider's platform and the Subscriber's appliance.

While the invention has been shown and described in conjunction with an embodiment, various changes can be made therein without departing from the spirit and scope of the invention as defined in the appended claims, in which:

We claim:

1. A process enabling a subscriber to personalize, modify and change in a service provider's calling system serving a subscriber device, a service provider's service logic, comprising the steps of:

a) implementing the service provider's logic for servicing subscribers as Java applets and Java beans in a Java virtual machine installed in a service provider's platform;

b) developing and installing service options using Java bean configuration options in the Java virtual machine;

c) performing testing of the Java bean options developed by the provider;

d) providing the service logic or Java beans to the subscriber from a web site download;

e) using a terminal, e.g., PC coupled to a provider service center, and a provider service kit to alter the provider's service logic for personalized subscriber service configurations;

f) locally testing the altered service logic for personalized service followed by uploading to the provider calling system for remote testing;

g) remote testing of the altered service logic using information provided by the provider from a service web site;

h) performing a service logic update to a Service Management System; and i) downloading the personalized service logic to the Service Provider's platform.

2. The process of claim 1 further comprising the step of:

j) generating billing records in the provider calling system which supports both flat rate and usage-based billing records.

3. The process of claim 1 further comprising the steps of:

k) downloading the altered service logic to the subscriber device.

4. The process of claim 1 further comprising the step of:

l) downloading the altered service logic to a CD-ROM/diskette or to the subscriber working with a server-based service modification environment.

5. The process of claim 1 further comprising the step of:

m) provisioning a service provider's logic onto the Service provider's platform and distributing the service logic onto a subscriber appliance of choice.

6. A system for subscriber personalized and modifiable services in a communication system, comprising:

a) service provider platform coupled to a telephone system and an IP network;

b) a platform specific runtime machine included in the service provider platform;

c) a service management system coupled to the service provider platform;

d) means for installing service provider logic in the runtime specific machine to provide a subscriber with minimal customization subscriber service level; and e) means for enabling the subscriber to modify and test provider logic, before installation of personalized and modifiable services unique to the subscriber in the provider logic.

7. The system of claim 6 further comprising:

f) a Java virtual machine as the platform specific runtime machine.

8. The system of claim 6 further comprising:

g) Java applets and Java beans defining the service provider logic.

9. The system of claim 6 further comprising:

h) a tool kit provided to the subscriber for writing and modifying service provider logic.

10. The system of claim 6 further comprising:

i) a service provider web site coupled to a service center and the service management system for service modification of the service logic by a subscriber.

11. The system of claim 6 further comprising:

j) means for downloading from a web site to a subscriber the service provider logic for modification to provide subscriber personalized services; and k) means for uploading the modified service provider logic to the web site.

12. The process of claim 1 further comprising the step of:

n) downloading the altered service logic to both the service provider's platform and a subscriber appliance for services which support function sharing.

13. The system of claim 6 wherein the service provider is further coupled to any of the following: interactive cable TV system, wireless communication system and Internet Service providers.

14. The system of claim 6 wherein the platform specific runtime machine executes runtime code in real time.

* * * * *